United States Patent
Banks et al.

(10) Patent No.: US 8,200,740 B2
(45) Date of Patent: Jun. 12, 2012

(54) RETAINED PUBLISH/SUBSCRIBE SYSTEM

(75) Inventors: Andrew D. Banks, Romsey (GB); Gavin D. Beardall, Alresford (GB); Adrian D. Dick, Southampton (GB); Ian C. Vanstone, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 12/348,201

(22) Filed: Jan. 2, 2009

(65) Prior Publication Data

US 2009/0177753 A1    Jul. 9, 2009

(30) Foreign Application Priority Data

Jan. 3, 2008  (EP) .................................... 08150019

(51) Int. Cl.
*G06F 15/16* (2006.01)
*G06Q 10/00* (2006.01)

(52) U.S. Cl. ........ 709/201; 709/203; 709/204; 709/205; 709/206; 705/1

(58) Field of Classification Search .......... 709/201–203
See application file for complete search history.

(56) References Cited

U.S. PATENT DOCUMENTS

| | | | |
|---|---|---|---|
| 2003/0115336 A1* | 6/2003 | Auerbach et al. | 709/228 |
| 2003/0135556 A1* | 7/2003 | Holdsworth | 709/206 |
| 2006/0069587 A1* | 3/2006 | Banks et al. | 705/1 |
| 2007/0043867 A1* | 2/2007 | Shigeta | 709/226 |

* cited by examiner

*Primary Examiner* — Ashok Patel
*Assistant Examiner* — Evans Desrosiers
(74) *Attorney, Agent, or Firm* — Steven M. Greenberg, Esq.; Carey, Rodriguez, Greenberg & O'Keefe

(57) ABSTRACT

Disclosed is a method comprising steps of: a broker software application receiving a first published message on a topic from a publisher application and storing the first published message in a local storage location along with an indicator which indicates that the first published message originated from a publisher application that is local to the broker software application; the broker software application receiving a second published message on the topic from another broker software application and storing the second published message in the local storage location in place of the previously stored first published message, along with an indicator which indicates that the second published message originated from a publisher application that is remote to the broker software application; and the broker software application delivering the second published message, from the local storage location, to a requesting subscriber application which has requested a last retained publication message on the topic.

3 Claims, 2 Drawing Sheets

RETAINED PUBLISH/SUBSCRIBE SYSTEM

CROSS-REFERENCE TO RELATED APPLICATIONS

This application claims priority under 35 U.S.C. §119(a) to European Patent Application Serial Number EP08150019.1 filed 3 Jan. 2008 entitled "A RETAINED PUBLISH/SUBSCRIBE SYSTEM" the entirety of which is incorporated herein by reference.

FIELD OF THE INVENTION

The invention relates to a publish subscribe system and more particularly to a retained publication publish subscribe system.

BACKGROUND OF THE INVENTION

Publish/subscribe data processing systems have become very popular in recent years as a way of distributing data messages (publications). Publishers are typically not concerned with where their publications are going, and subscribers are typically not interested in where the messages they receive have come from. Instead, a message broker typically assures the integrity of the message source, and manages the distribution of the message according to the valid subscriptions registered in the broker.

Publishers and subscribers may also interact with a network of brokers, each one of which propagates subscriptions and forwards publications to other brokers within the network.

FIG. 1 illustrates a typical publish/subscribe data processing system according to the prior art. A message broker 15 has an input mechanism 20 which may be, for example, an input queue or a synchronous input node by which messages are input when they are sent by a publisher 5; 10 to the message broker. A published message is fetched from the input mechanism by a controller 40 and processed to determine, amongst other things, to which subscribers 60; 65; 70 the message should be sent.

Message topics typically provide the key to the delivery of messages (publications) between publishers and subscribers. The broker attempts to match a topic string on a published message with a list of clients who have subscribed to receive publications including that topic string. A matching engine 30 is provided in the message broker for this very purpose. When the subscriber registers, it must typically specify a means by which it wants to receive messages (which may be a queue or other input mechanism) and a definition of the types of messages that it is interested in. A subscriber can specify that it wishes to receive messages including a topic string such as "employee/salary" and any messages matching that topic string will be identified and forwarded on to the subscriber via an output mechanism 50. (Note, there may be more than one input and output mechanism to and from which messages are received and sent by the message broker.)

A broker typically deletes a publication when it has delivered that publication to all the interested (registered) subscribers. This type of processing is suitable for event information (e.g. a stock trade or a goal scored), but is not always suitable for a subscriber that registers subsequently and wishes to be informed of the latest state information (e.g. the current price of a stock). A broker can therefore take it upon itself to keep, for example, a copy of the last publication published on each topic. Each such copy is called a retained publication.

Such a copy can be sent to subsequent subscribers who register an interest in the topic relating to the retained publication. This means that new subscribers don't have to wait for information to be published again before they receive it. For example, a subscriber registering a subscription to a stock price would receive the latest price straightaway, without waiting for the stock price to change (by being re-published).

Thus, the last publication on each topic in a retained publication system is typically retained by the message broker (publishing broker/node) to which those publications are published. This method requires that all brokers manage (retained) publications received locally. A subscriber would then receive the retained publication that is held by the subscriber's local broker. A problem with this is that one subscriber may receive a retained publication having one contents (e.g., IBM stock price is $4) from its local broker and another subscriber may, at the same time, receive a retained publication having another contents (e.g., IBM stock price is $5) from its local broker, so there is no definitive answer as to, at a certain point of time, what is the most recent retained publication in the network.

This latter problem may be solved by having only one broker which is considered to hold the definitive version of the retained publication. However, that solution suffers from the disadvantage that there is now a bottleneck in that one broker, which can go off-line, or otherwise be unavailable.

SUMMARY OF THE INVENTION

The present invention provides a method as claimed in claim 1, and corresponding system and corresponding computer program stored on a storage medium.

DESCRIPTION OF THE DRAWINGS

A preferred embodiment of the present invention will now be described, by way of example only, and with reference to the following drawings.

DETAILED DESCRIPTION

Figure 1:
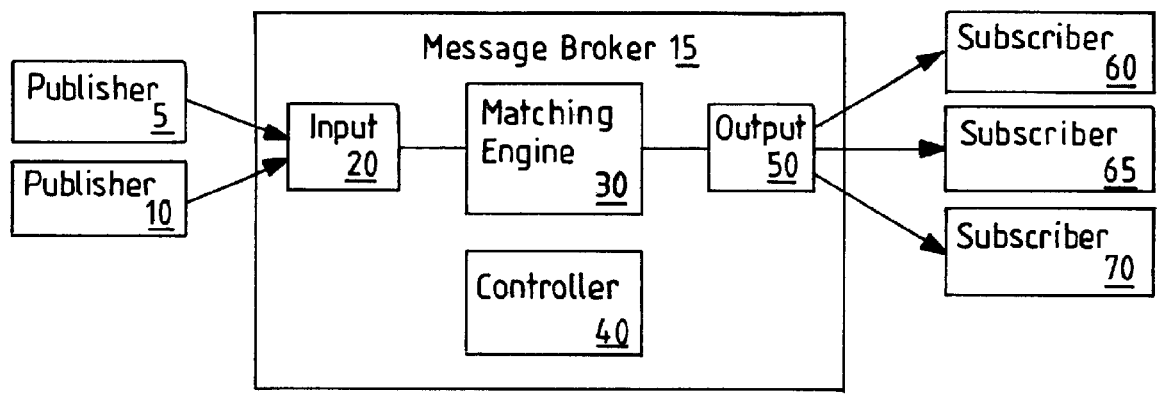
FIG. 1 illustrates a publish/subscribe system in accordance with the prior art.
Figure 2:
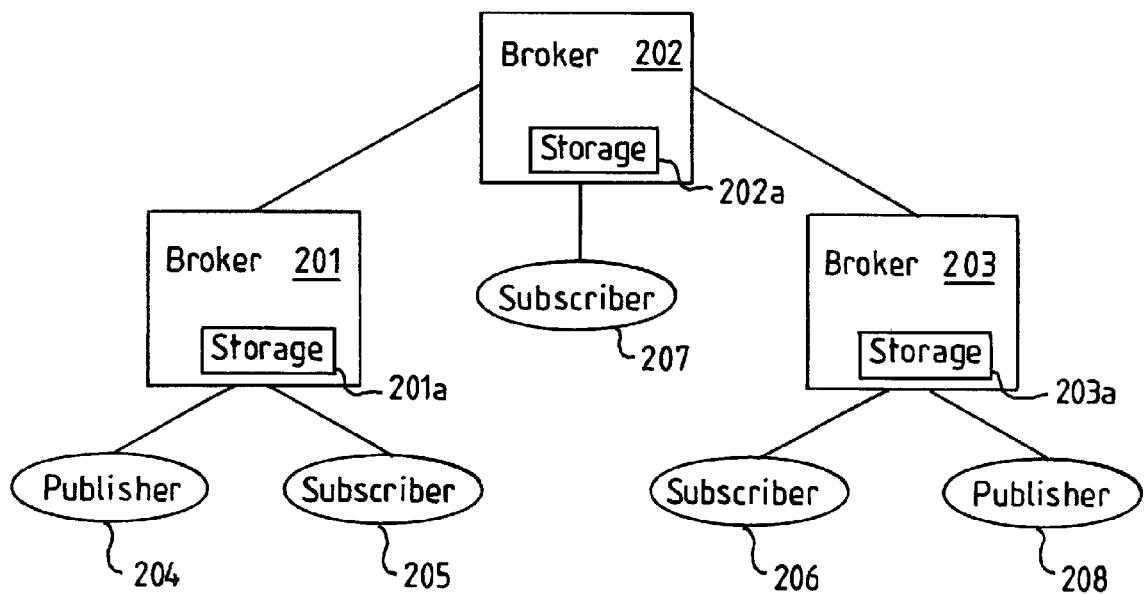
FIG. 2 illustrates a publish/subscribe system in accordance with a preferred embodiment of the present invention.

In FIG. 2, three brokers 201, 202 and 203 are shown. Broker 201 has a local publisher 204 and a local subscriber 205. Broker 202 has a local subscriber 207. Broker 203 has a local subscriber 206 and a local publisher 208.

Each broker 201, 202 and 203 retains that broker's view (which is the last message received) as to what the last retained message is, in the storage 201a, 202a or 203a, which is preferably non-volatile storage, of the respective broker, as will be described in detailed below. When a local subscriber requests the last retained message, the broker local to that subscriber provides the stored last retained message from the local storage to the local subscriber.

Each broker 201, 202 and 203 keeps, in its local storage 201a, 202a or 203a, respectively, a table of, for each subscription topic, the last retained message for that topic, and, an indicator (e.g., a flag) indicating whether that last retained message originated locally to that broker or whether that last retained message originated remotely from that broker. For example, in FIG. 2, if publisher 204 published a message on a topic to its local broker 201, the broker 201 would store the published message in the storage 201a along with a flag indicating that the message originated locally from publisher 204 which is communicating directly with broker 201 (not via an intermediary broker). The broker 201 would then propagate the message to the other brokers 202 and 203, both of which would, upon receipt, store the message in their respective storages 202a and 203a, along with a flag indicating that the message originated remotely (meaning that the message came from another broker, broker 201 in this case).

Because a broker, such as 201, stores, as a retained publication, not only a publication that was received from a local publisher, but also a publication that came via another broker (a remote publication), this provides an improved publish/subscribe retained publication system in that a subscriber 205 can be surer now that the retained publication that it receives from its local broker 201 really does predate the other publications that the subscriber will receive afterwards.

Figure 3:
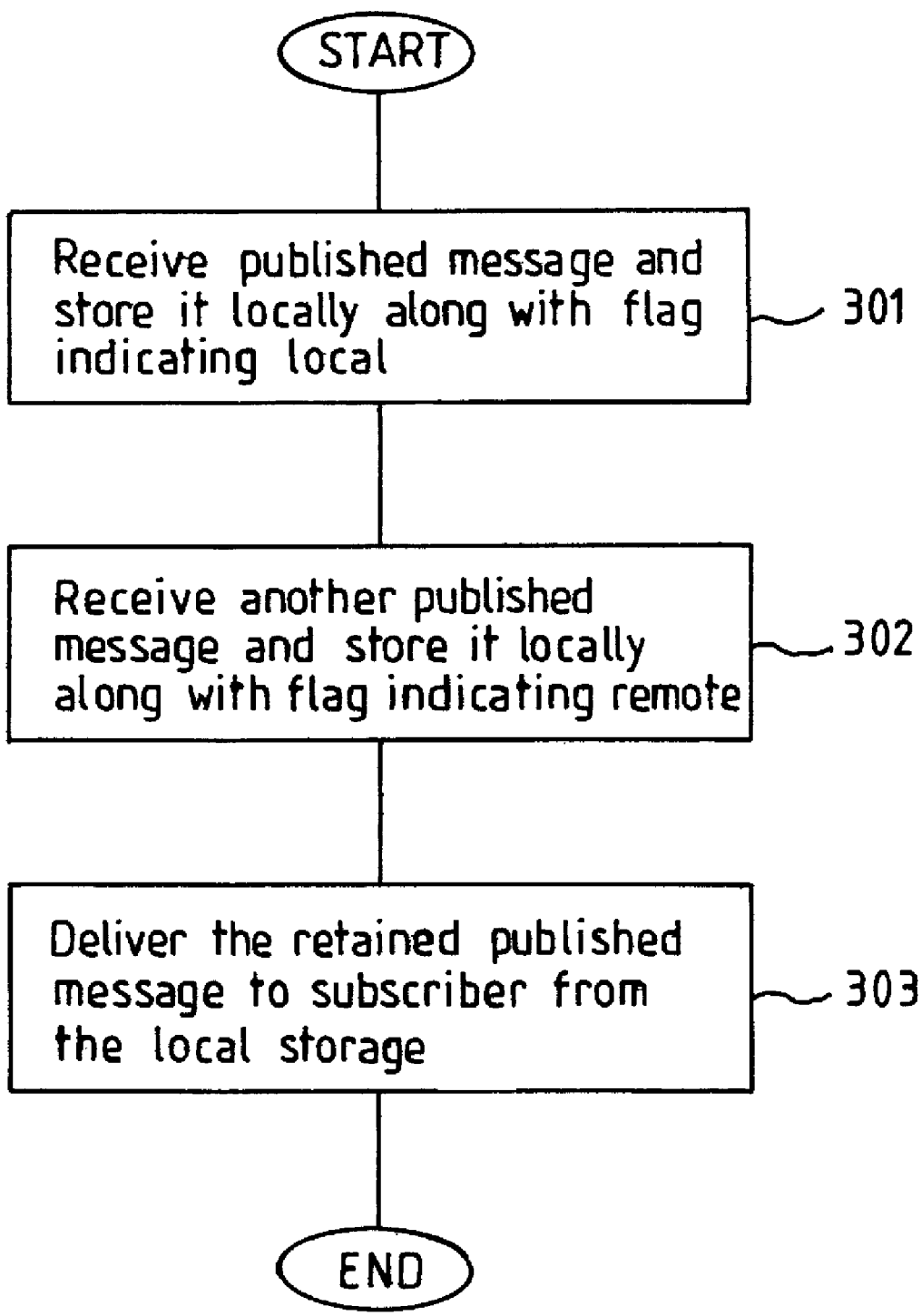
FIG. 3 is a flowchart illustrating the operation of a broker application according to a preferred embodiment of the present invention.

FIG. 3 is a flowchart illustrating the processing steps taking place at a broker (e.g., 201) according to a preferred embodiment of the present invention.

At step 301, broker 201 receives a first published message (e.g., $5 per share) on a topic (e.g., IBM stock price), and stores the message in storage location 201a, along with a flag indicating that the message came from a local publisher 204.

At step 302, broker 201 receives a second published message (e.g., $4 per share) on the same topic, and stores the message in storage location 201a, in place of the prior message (i.e., first published message of $5 per share) that was stored there as a result of step 301. This new message is stored in location 201a with a flag indicating that the message came from/via another broker. For example, the new message was published by publisher 208, and so the message was propagated to broker 201 via brokers 203 and 202.

Finally, at step 302, broker 201 delivers the retained publication message stating that the IBM stock price is $4 per share, to a subscriber 205 which has made a request for the last retained publication on that topic.

If a broker (such as broker 201) determines that there are no longer any local subscribers left for a particular topic (all local subscribers, such as 205, have ended their subscriptions to a topic), the broker can delete the retained publication for that topic, if the flag indicates that the retained publication is "remote". This helps to keep the storage location (e.g., 201a) down to a small size.

When the last subscriber, throughout the whole network, unsubscribes to a topic, all brokers, except the one where the last publication originated, remove their copy of the retained publication from their local storage. The broker where the last publication originated will be used to prime any new subscribers that subsequently appear.

When a publisher 204 publishes a message to its local broker 201, the broker stores the message as the last retained publication and then passes it along for each proxy subscription with other brokers, that exists.

When a new subscriber 206 requests the last retained publication from its local broker 203, broker 203 provides the retained publication that is stored in its local storage 203a, and then makes proxy subscriptions to neighbouring brokers, as usual.

When a new subscriber subscribes to a topic at a broker 201, and the broker does not have a retained publication in its local storage, an existing retained publication is provided from each other broker where a publisher has previously published. There may be zero, one, or many such publications, and if there are many, then one must be chosen by the broker 201 (for example, the broker 201 can choose the first one that is received). Future republications received after the first one are not delivered to subscribers.

The invention claimed is:

1. A method taking place in a broker computer system in a publish/subscribe system comprising steps of:
   receiving a first published message on a topic from a local publisher and storing the first published message in a local storage location along with an indicator which indicates that the first published message is originated from a local publisher;
   receiving a second published message on the topic from another broker and storing the second published message in the local storage location in place of the previously stored first published message, along with an indicator which indicates that the second published message is originated from a remote publisher and received via another broker;
   delivering the second published message, from the local storage location, to a requesting local subscriber which has requested a last retained publication message on the topic; and
   upon determining that there is no longer any local subscriber left for the topic, deleting any retained publication message on the topic having an indicator which indicates that the retained publication message is originated from a remote publisher and received via another broker.

2. A broker computer hardware system in a publish/subscribe system, comprising:
   local storage;
   a processor configured to
      receive a first published message on a topic from a local publisher;
      store the first published message in the local storage along with an indicator which indicates that the first published message is originated from a local publisher;
      receive a second published message on the topic from another broker;
      store the second published message in the local storage, in place of the previously stored first published message, along with an indicator which indicates that the second published message is originated from a remote publisher and received via another broker;
      deliver the second published message, from the local storage, to a requesting local subscriber which has requested a last retained publication message on the topic; and
      upon determining that there is no longer any local subscriber left for the topic, delete any retained publication message on the topic having an indicator which indicates that the retained publication message is originated from a remote publisher and received via another broker.

3. A computer program product comprising a computer usable storage medium device having stored therein computer usable program code, which when executed on a broker computer hardware system in a publish/subscribe system, causes the broker computer hardware system to perform: receiving-a first published message on a topic from a local publisher; storing the first published message in a local-storage along with an indicator which indicates that the first published message is originated from a local publisher; receiving a second published message on the topic from another broker; storing the second published message in the local storage, in place of the previously stored first published message, along with an indicator which indicates that the second published message is originated from a remote publisher; delivering the second published message, from the local storage, to a requesting local subscriber which has requested a last retained publication message on the topic; and upon determining that there is no longer any local subscriber left for the topic, deleting any retained publication message on the topic having an indicator which indicates that the retained publication message is originated from a remote publisher and received via another broker.

* * * * *